Figure 1:
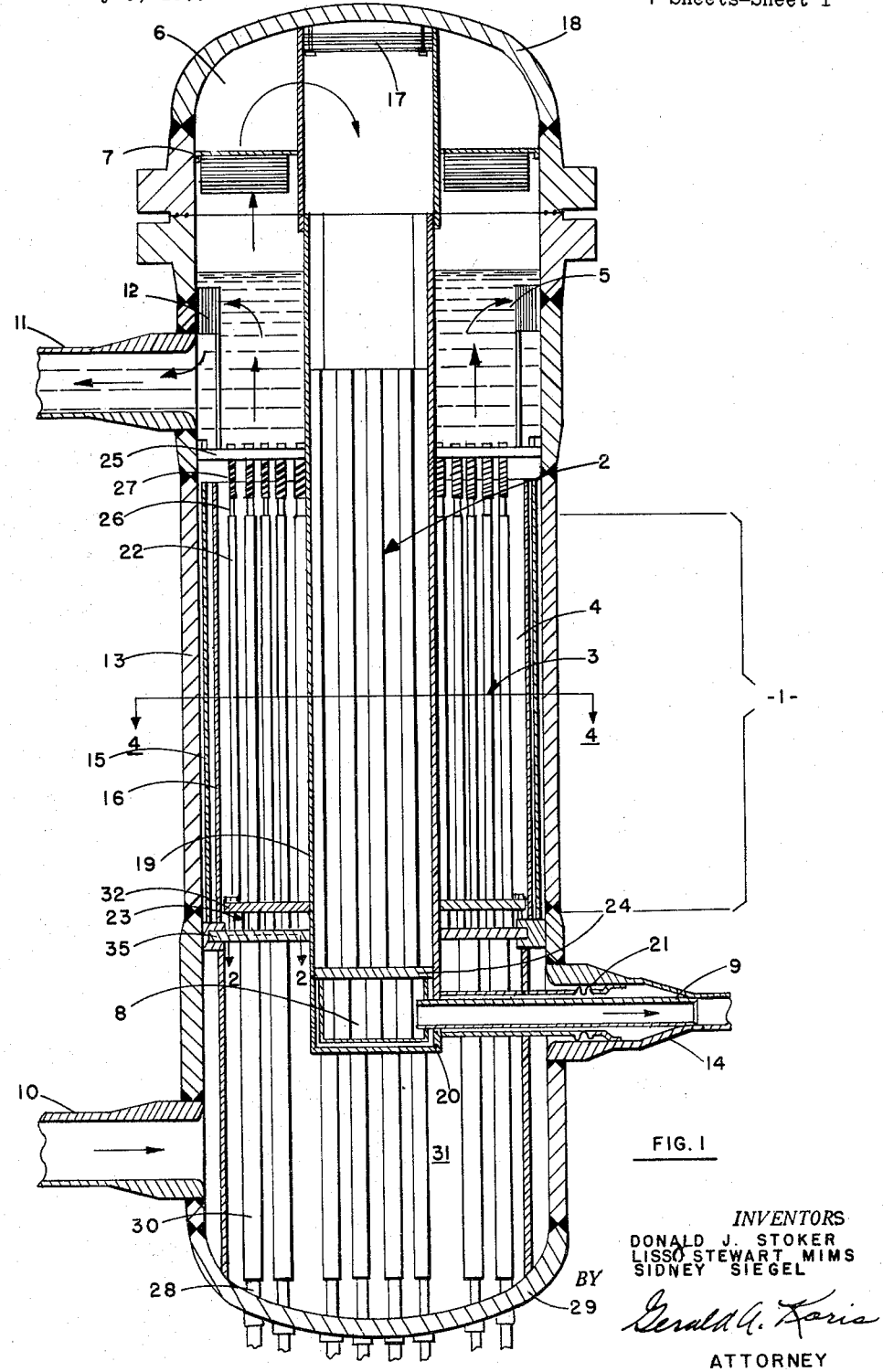

Sept. 22, 1964     D. J. STOKER ETAL     3,150,052
STEAM SUPERHEAT BOILING WATER NUCLEAR REACTOR Filed July 3, 1959     7 Sheets-Sheet 1

FIG. I

INVENTORS
DONALD J. STOKER
LISSO STEWART MIMS
SIDNEY SIEGEL

BY Gerald A. Koris

ATTORNEY

INVENTORS
DONALD J. STOKER
LISSO STEWART MIMS
SIDNEY SIEGEL
BY
*Gerald A. Koris*
ATTORNEY Sept. 22, 1964     D. J. STOKER ETAL     3,150,052
STEAM SUPERHEAT BOILING WATER NUCLEAR REACTOR
Filed July 3, 1959     7 Sheets-Sheet 3

INVENTORS
DONALD J. STOKER
LISSO STEWART MIMS
SIDNEY SIEGEL
BY
ATTORNEY

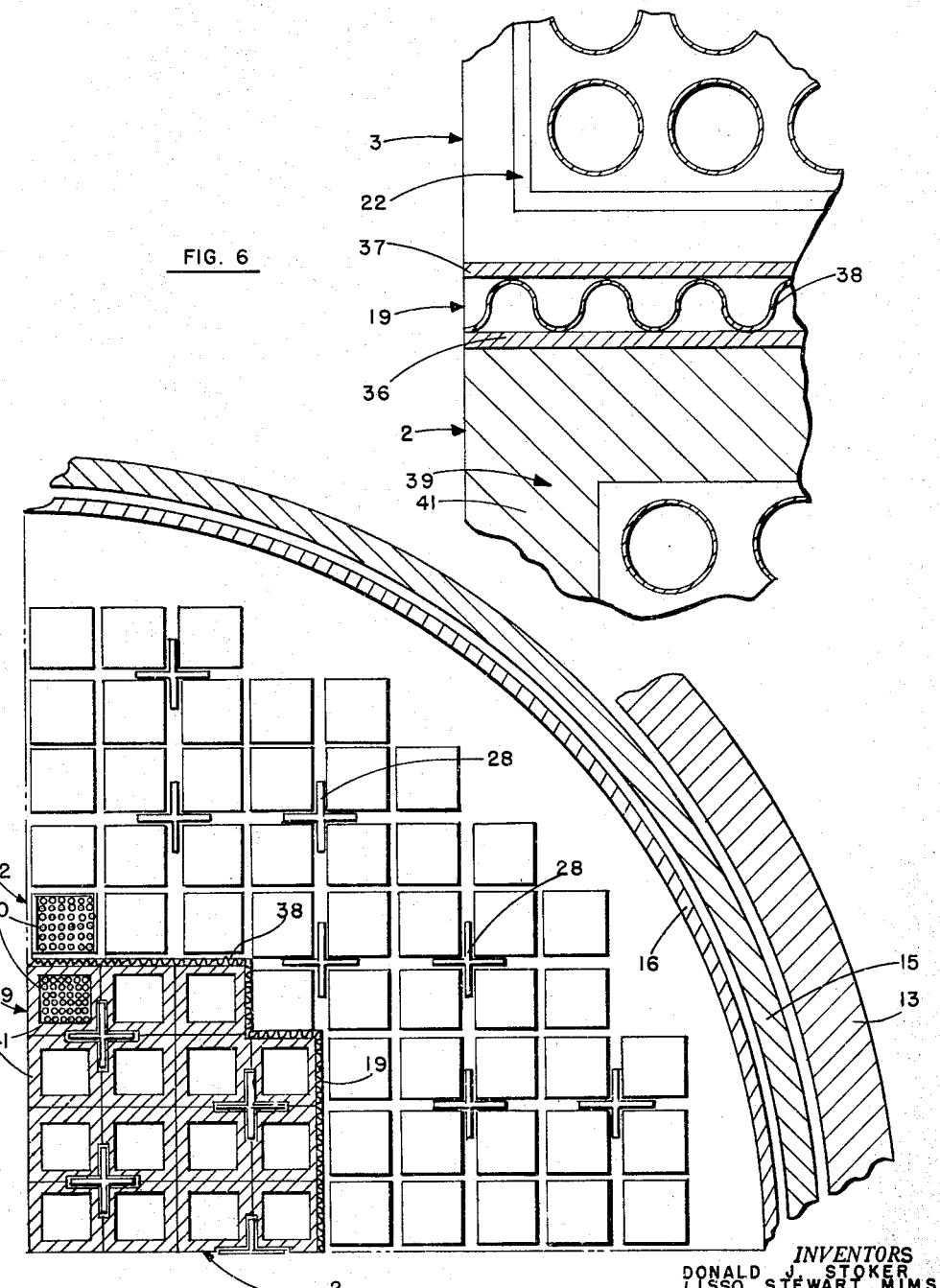

INVENTORS
DONALD J. STOKER
LISSO STEWART MIMS
SIDNEY SIEGEL
BY
*Gerald A. Koris*
ATTORNEY

INVENTORS
DONALD J. STOKER
LISSO STEWART MIMS
SIDNEY SIEGEL
BY

ATTORNEY

Sept. 22, 1964 D. J. STOKER ETAL 3,150,052
STEAM SUPERHEAT BOILING WATER NUCLEAR REACTOR
Filed July 3, 1959 7 Sheets-Sheet 7

*INVENTORS*
DONALD J. STOKER
LISSO STEWART MIMS
BY SIDNEY SIEGEL

ATTORNEY

United States Patent Office 3,150,052
Patented Sept. 22, 1964

3,150,052
STEAM SUPERHEAT BOILING WATER
NUCLEAR REACTOR
Donald J. Stoker, Reseda, Lisso Stewart Mims, Tarzana, and Sidney Siegel, Pacific Palisades, Calif., assignors to North American Aviation, Inc.
Filed July 3, 1959, Ser. No. 824,874
7 Claims. (Cl. 176—54)

Our invention relates to a nuclear reactor with nuclear superheat, and more particularly to an improved boiling water reactor with nuclear superheat.

A great deal of experience has been accumulated with water cooled reactors, both of the pressurized and boiling varieties. The water reactors have found favor because of the excellent moderating properties of hydrogen, the satisfactory cooling characteristics of water, and the existing large body of technology developed from the use of water in conventional power plants. Among the drawbacks of the water reactor systems, however, has been a practical limitation of the maximum temperatures of water or steam to below approximately 600° F. Thus, the steam conditions in water reactor power plants are considerably below that of standard practice in modern conventional power plants. The overall efficiencies of such plants have been correspondingly low, as compared with standard conventional practice, for example in the order of 25%. Superheat is a way of improving the quality of steam, and conventional oil and coal-fired superheaters, and nuclear superheat have been considered for use with nuclear reactors. In nuclear superheat, the superheater is an active region of the reactor core containing fuel elements, and a moderator is accordingly required therein. It therefore is relevant to examine superheater moderator requirements. Heretofore water has been considered as the moderator for the superheater region in water cooled reactors because of simplicity in dealing with a single fluid in the reactor, but a number of drawbacks are apparent. If water is used for the moderator it must be insulated from the superheater to prevent heat loss to it from the superheated steam. Since considerable heat is in any event absorbed in the water, it must be circulated and cooled externally or mixed with saturated steam leaving the boiling region. If mixed with saturated steam leaving the boiling region, a heat balance must be reached, and if the heat is exhausted to a separate coolant stream, additional piping and pumping is required.

Furthermore, rather complicated seals and flow paths must be provided for the water. Another drawback of water moderator is that the required thermal insulation between the water and steam serves to diminish the neutron economy of the system through neutron absorption. A solid thermal insulation material which is of low neutron cross section, radiation damage is resistant, and impervious to steam and water, has not yet been developed. If thin walls are used to separate the steam and liquid moderator, the sections must be kept at essentially the same pressure to avoid channel bursting or collapse.

Finally, changes in moderator temperatures produce large changes in moderator densities and moderating power, leading to nuclear instabilities.

It is, accordingly, an object of our present invention to provide an improved nuclear reactor with nuclear superheat.

It is another object to provide an improved boiling water reactor with an integral nuclear superheater.

Another object is to provide an improved nuclear superheat of boiling water reactor with a two-region core.

Another object is to provide such a reactor wherein the need for insulation between the fuel elements and moderator in the superheater is eliminated and improved neutron economy is achieved.

Still another object is to provide such a reactor which does not require a pressure balancing system between steam and moderator.

Still another object is to provide such a reactor which eliminates complicated seals and flow paths.

Yet another object is to provide such a reactor wherein changes in moderator temperature do not have a large effect on moderating power or nuclear stability.

Figure 2:
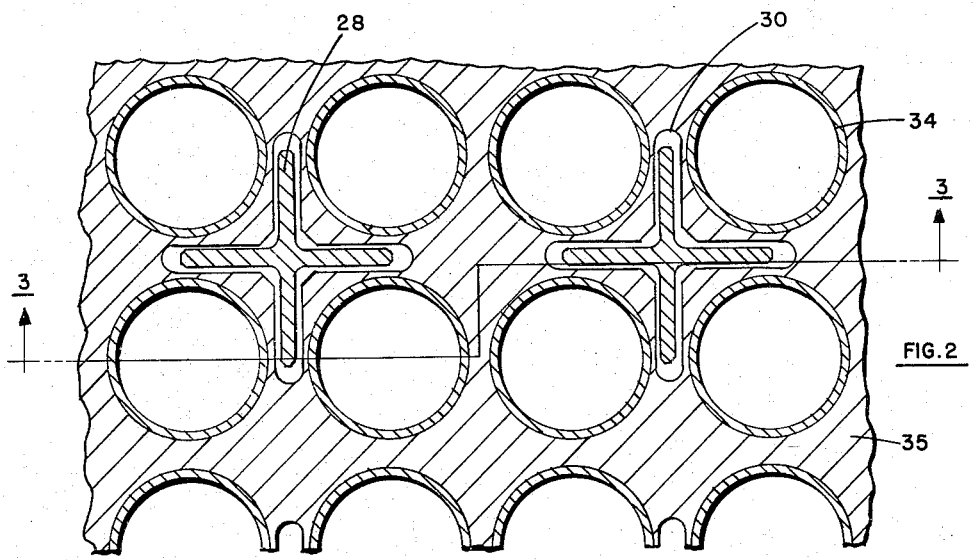
Figure 3:
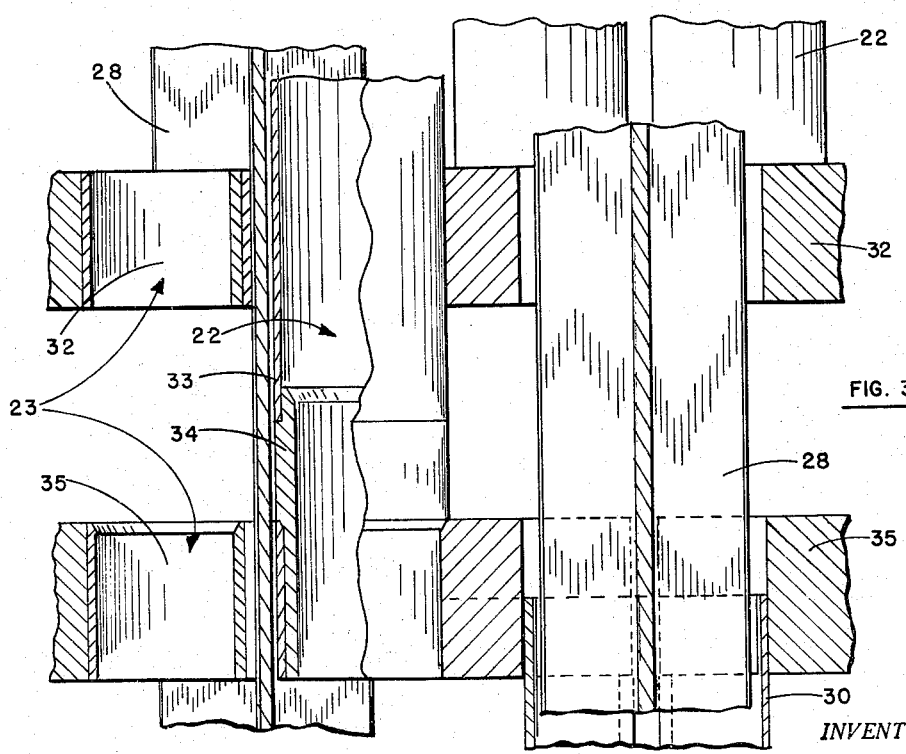
Figure 8:
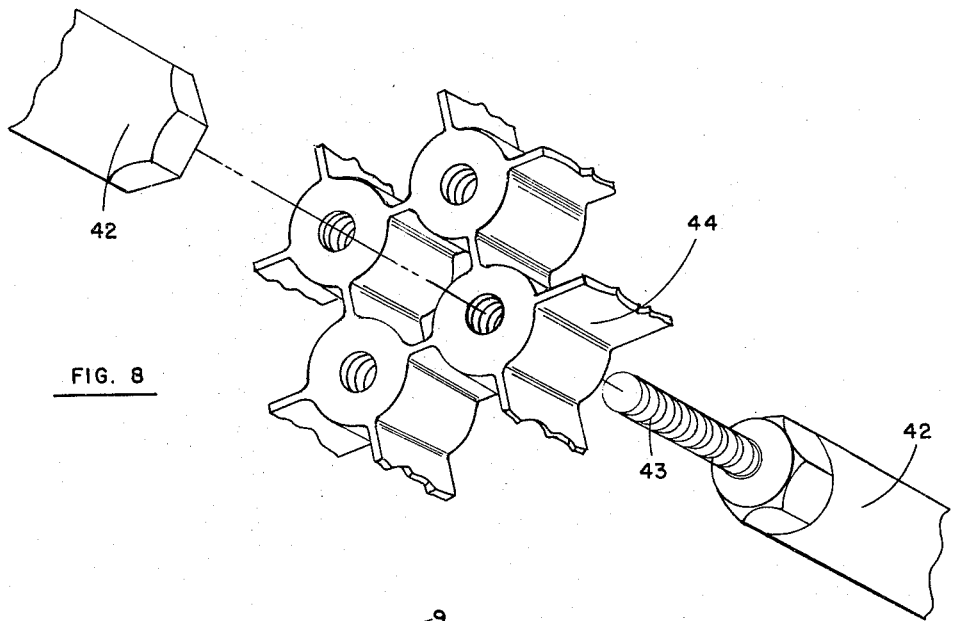
Figure 4:
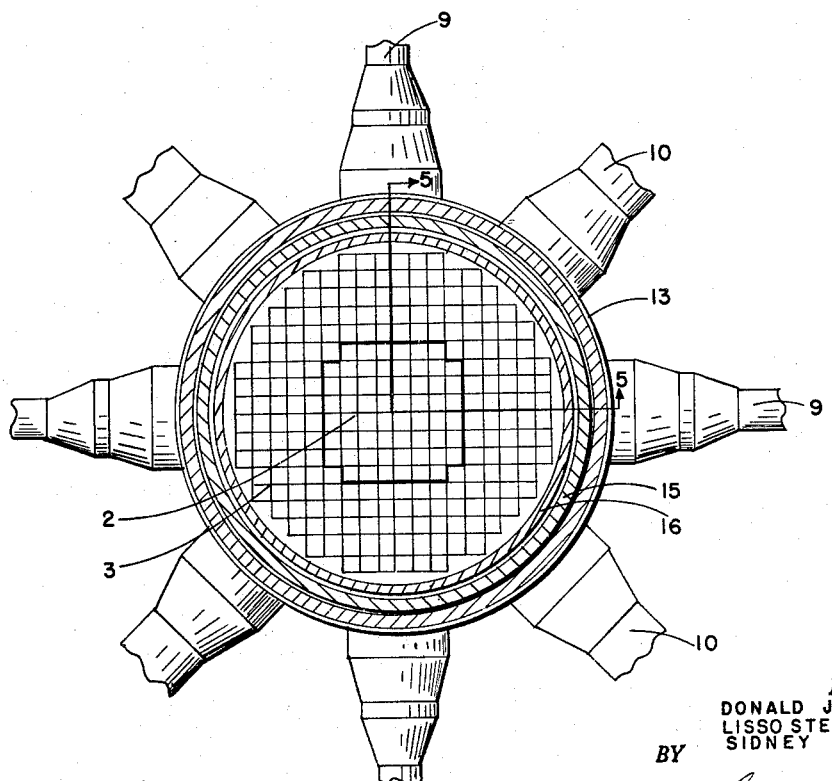
Figure 7:
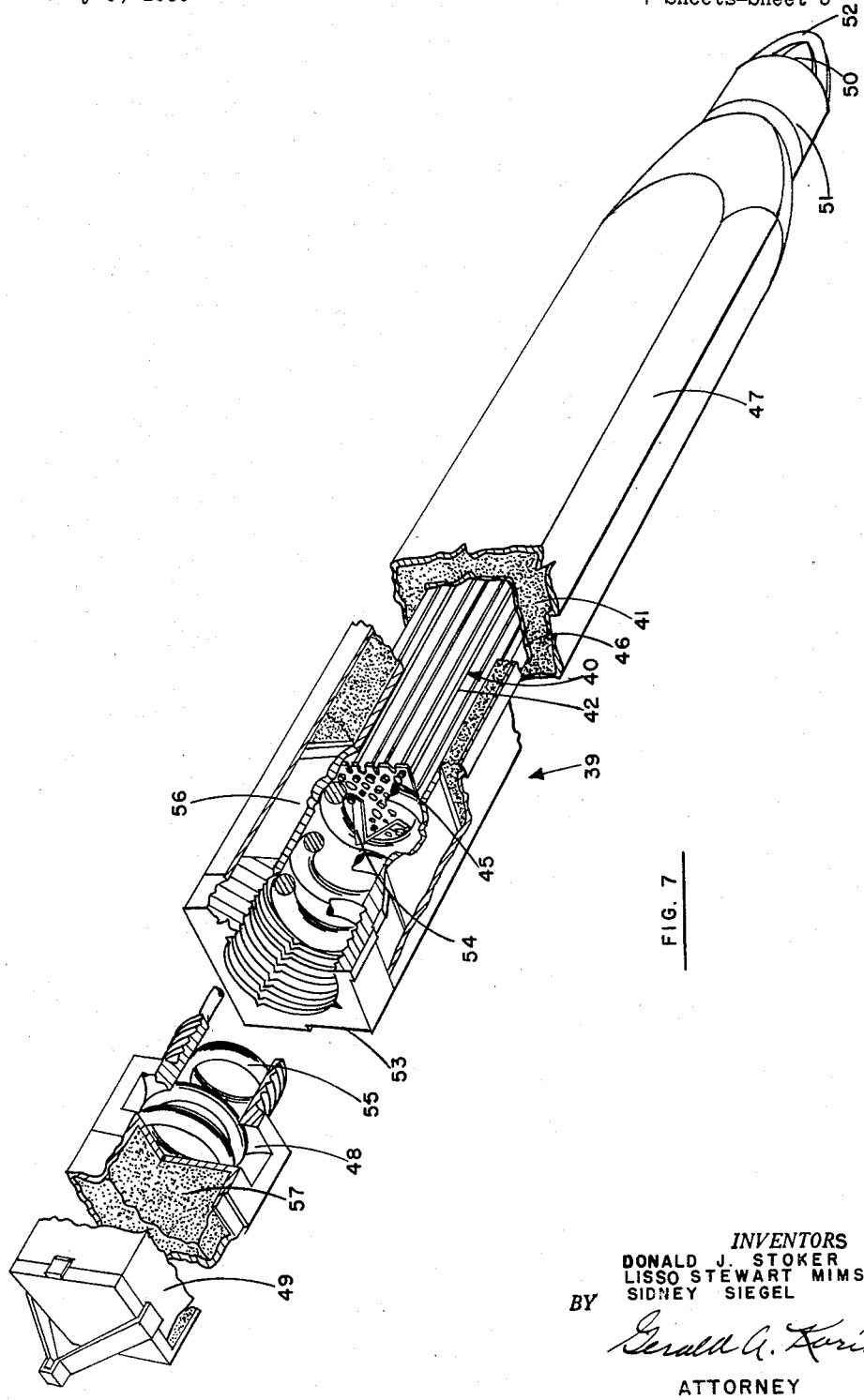
Figure 9:
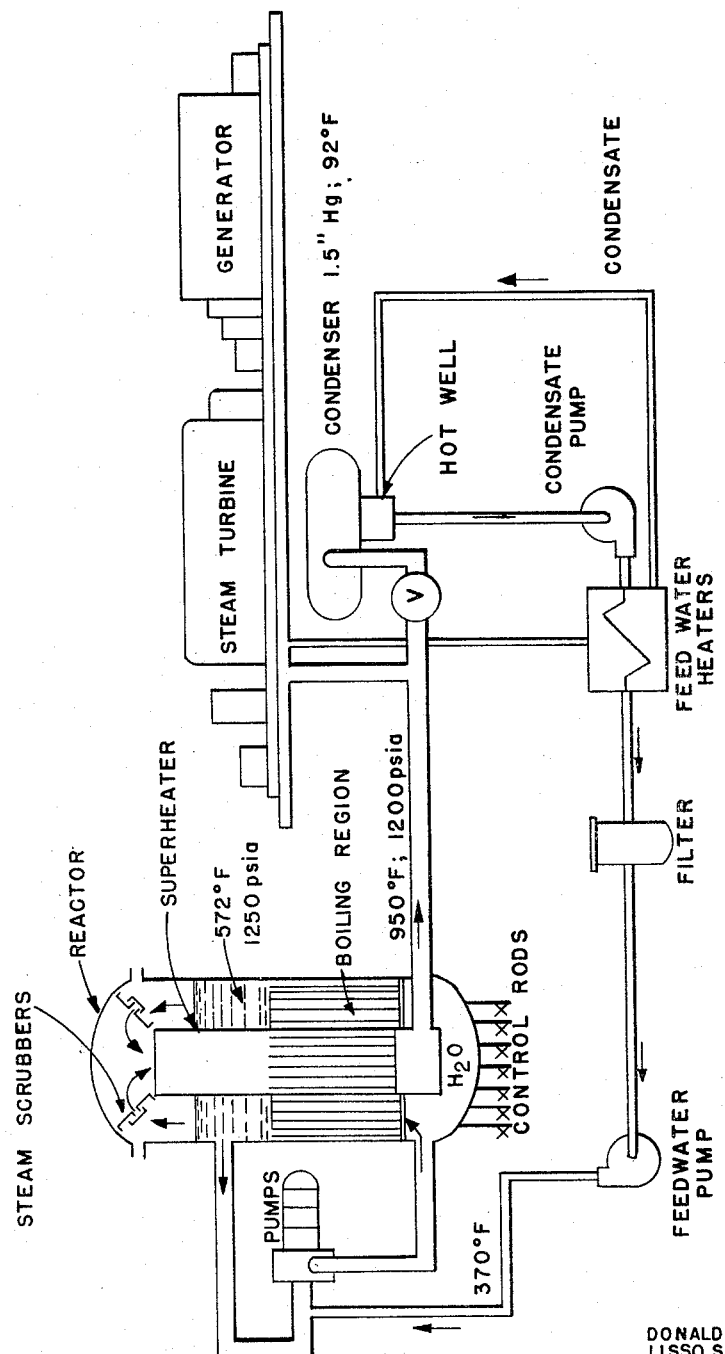
Figure 10:
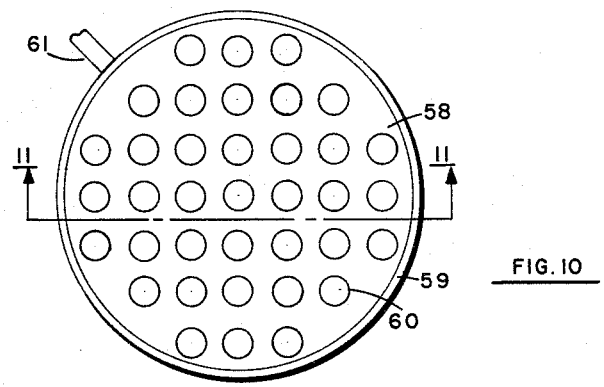
Figure 11:
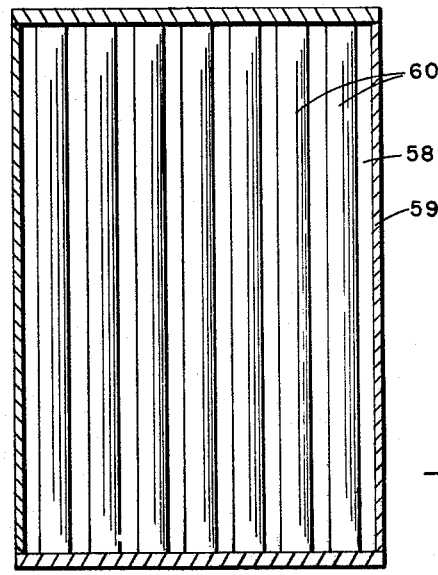

The above and further objects and advantages of our invention will become apparent from the following detailed description, taken together with the accompanying drawings and the appended claims. In the drawings, FIG. 1 is an overall elevation view, partly in section, of a representative embodiment of our invention. FIG. 2 is an enlarged section of the lower grid plate of FIG. 1; FIG. 3 is a section through FIG. 2, partly in elevation; FIG. 4 is a section through the active core region of FIG. 1, partly in plan; FIG. 5 is an enlarged sectional quadrant of FIG. 4 showing the reactor core arrangement; FIG. 6 is an enlarged detail of FIG. 5; FIG. 7 is a perspective view of a fuel element, partly cut away; FIG. 8 is a perspective of an interior structural portion of the fuel element shown in FIG. 7; FIG 9 is a schematic flow diagram of the reactor process system; FIG. 10 is a plan of an alternate embodiment of the nuclear superheater region; and FIG. 11 is a section through FIG. 10.

Basically, our invention comprises a two-region direct or dual cycle boiling water reactor with an integral nuclear superheater utilizing a solid moderator in the steam superheat region. The utilization of a superheater with a solid moderator gives gross thermal efficiencies on the order of 40%; permits use of conventional designed steam turbine; requires only slightly enriched uranium throughout the entire two-region core; reduces fuel and capital costs; and reduces the size of the pressure vessel compared to a conventional boiling water reactor of similar generating capacity. Improved nuclear stability is obtained because there is no large density change of moderator.

The reactor consists of two close coupled regions. The boiling region produces saturated steam bubbles in the water which rise to the top of the reactor vessel. The steam then reverses flow direction and enters the superheater, wherein it is superheated to the desired temperature. The superheater region may be disposed in either the center or edge of the core tank, or may be an annular region between two boiler regions.

The use of a solid moderator in the superheater region affords a number of striking advantages over water moderator. The solid moderator can be operated at steam or higher temperatures, thereby eliminating the need for insulation between the steam and the moderator, and the need for moderator cooling. This simplifies the core design and decreases heat losses. Elimination of the insulation between steam and moderator further serves to improve neutron economy by removing neutron absorbing material. Changes in moderator temperature do not have a large effect on the moderating power as in the case of water moderator. Furthermore, no pressure balance system is required between the steam and the moderator. The advantages of our two-region boiling water reactor with a solid moderated, integral nuclear superheat region are thus many and varied, and the reactor represents a distinct advance in boiling water reactor technology. The solid moderator may be satisfactorily selected from graphite, beryllium (metal or oxide), and metal hydrides. Graphite technology is well advanced, but the core size required is greater than with the others. Beryllium oxide is attractive because the material might be used unclad in a steam atmosphere. However, BeO technology is not as far advanced, and the cost would be greater than for the other solid materials. The hydride is preferred because the greater moderating density of hydrogen leads to a smaller core size. The metal hydride also permits spatial variation of the hydrogen density in the moderator. In this way considerable flux flattening in both radial and axial directions can be achieved, by adjusting the hydrogen density, usually in decreasing radial and axial concentrations. It should be understood that by "hydride" it is intended to embrace both the light hydrogen isotope of mass 1 and the heavier isotope deuterium of mass 2. With the deuteride, due to its lower neutron absorption cross section, fuel enrichment requirements are lessened, and natural uranium may be used in at least certain portions of the core.

The metal hydride may be chosen from any of the metal hydrides heretofore considered or used for nuclear reactor application, and no one metal or metal alloy hydride is critical. The metal portion of the hydride is preferably of relatively low thermal neutron absorption cross section, and forms hydrides which are relatively stable at elevated temperatures. Among the hydrides which may be used are lithium, calcium, yttrium, niobium, vanadium, tantalum, titanium, and zirconium hydrides. Zirconium hydride is the best understood and most commonly employed of the hydride systems, and its use in our invention is accordingly preferred. Zirconium hydride has oxidation properties little different from zirconium itself. Massive zirconium hydride has better thermal conductivity than zirconium, and higher hydrogen density than saturated water at 600° F. Small core size heretofore associated only with water moderated reactors is therefore possible. $ZrH_2$ also has twice the ultimate strength of zirconium, although it is brittle. While massive zirconium hydride has better structural and heat transfer characteristics than powdered $ZrH_2$, the powdered material is considerably cheaper, and for certain applications, such as described below with reference to FIGURES 10 and 11, is preferred. To protect zirconium hydride against oxidation and loss of hydrogen at elevated temperatures, it should be clad or kept in a reducing atmosphere. A large number of metals and metal alloys and ceramic-metal compositions are available for cladding zirconium hydride and the use of one particular composition is not essential. For high temperature application (greater than 1600° F.) molybdenum, titanium, inconel and other nickel-chromium alloys of satisfactory oxidation resistance may be employed. For temperatures in the range of 1000° to 1200° F., the general range of interest in our invention, zirconium alloys, and the austenetic or ferritic stainless steels, particularly the 300 series such as types 304 and 347, can very satisfactorily be used as direct protective cladding. When desired, because of temperature considerations in the moderator, a metallurgical bond may also be applied between the moderator and the protective cladding. Methods generally known to the art may be employed; four possible fabrication methods are suggested. These methods are in situ hydriding of a canned zirconium shape; coextrusion of the hydride with cladding; contact alloy brazing where a braze is applied to the hydride before canning in the heat treatment; and isostatic pressure bonding of the cladding to the hydride.

Referring now to FIG. 1, our reactor has an active core 1 in the shape of a right circular cylinder, with a central superheater 2, an annular boiler 3, and a surrounding reflector 4. While the superheater is shown as located in the center of the two regions, it may also be located on the edge of the core. Locating the superheater at the edge, where the neutron flux is lowest, results in good neutron economy. However, center location has a number of advantages, which led to the presently described embodiment of our invention. Center location tends to flatten radial flux, and hence reduce over all peak-to-average power ratio, achieving higher average burnup. Insulation of the superheater is easily accomplished with only one side of small area to be insulated. Recirculation of boiler water is achieved without piping passing through the superheater region. Finally, the flow area required for the superheater is comparatively smaller.

Water 5 is used as the moderator in the boiling region and as the reflector. Zirconium hydride is the moderator in the superheater. Steam generated in the boiler passes above to a steam dome 6, and as indicated by the flow arrows, through steam scrubbers 7 into the central superheater in a single downward path, then into a steam plenum 8, and leaves the core through steam outlet lines 9. Boiler water is circulated upward through the core by four pumps in external loops; the water is introduced through inlet line 10 and removed through outlet line 11 after passing through entrainment separators 12. Of the total reactor power, approximately 25% is developed in the superheater and the remainder in the boiler region. The core tank (pressure vessel) 13 is constructed of carbon steel clad with stainless steel, with the exception of the outlet end of the superheater nozzle 14 which is stainless steel. The inner wall of the core tank also has a stainless steel cladding. Two thermal shields 15 and 16, 1" and 2" thick, extend approximately 1" above and below active core 1, and separate the core tank from the core. Another thermal shield 17 is positioned near the core tank head 18 and separates it and superheater region 2. In the present design, the core vessel has an outside diameter of 10 feet, an overall height of 35 feet and a wall thickness of 5". The entire pressure vessel shell is essentially at the temperature of the boiling water.

The superheater 2 is separated from boiler 3 by an insulator region 19. The steam plenum 8 and steam outlet 9 line have an insulating jacket 20 which contains saturated steam bled into it from the boiler. The jacket 20 around the steam line has a bellows 21 for thermal expansion purposes. The insulation prevents heat loss of superheated steam to the boiler region, and particularly from the steam plenum to cold inlet water.

The fuel elements 22 of the boiler seat on a two section lower grid plate 23 which aligns the element and carries the majority of the weight of the core. The superheater fuel elements sit on a single bottom grid plate 24 which forms the top of steam plenum 8. The upper grid plate 25 in the boiler region holds the fuel elements down against the frictional load of upward flowing water with connecting rod 26 and spring 27. The control rods 28 are bottom-driven, enter the core tank through the bottom cover 29 and are guided past lower grid plate 23 in guide tubes 30 positioned in the plenum 31 below the active core region between bottom core tank cover 29 and grid plate 23.

The steam separation or moisture removal from the saturated steam is accomplished by conventional steam scrubbing devices located in the core tank 12 and vessel head 7 or in steam separators located outside the pressure vessel. With a water purity of 1.0 p.p.m. (max.) in the boiler and a water carry-over through the scrubbers of 0.5%, the saturated steam entering the superheater would have a solids content of only 0.005 p.p.m.

The details of the boiler fuel element and control rod guide tube seating in the two section lower grid plate 23 are seen in FIGURES 2 and 3. The fuel element 22 passes through the upper section 32 of the lower grid plate. The frame of the fuel element 33, which supports the active fuel region, is welded to a tapered hollow nozzle 34 which sits in the lower section 35 of the bottom grid plate. The control rod guide tube 30 extends into the lower bottom grid plate 35 where it is free to slide in thermal expansion or contraction. The guide tubes do not extend into the active core region; in the active core region the control rods are guided by the fuel elements, as will be shown below.

The core tank 13 thermal shields 15 and 16, water inlet lines 10 and steam outlet lines 9, and the integral boiler 3 and superheater 2 core, may be seen clearly in FIG. 4. Turning now to FIG. 5, which is an enlarged quadrant of the core shown in FIG. 4, we see that the core lattice has about 256 spaces with 60 of the spaces occupied by superheater 2. The lattice spacing is 5". The insulator region 19 between the boiler and superheater regions is seen clearly in the enlarged fragment FIG. 6. The wall 36 of the superheater and the wall 37 of the boiler are separated by corrugated stainless steel 38. The corrugation lends additional strength to the thin boiler and superheater walls, and takes up any pressure differential resulting from pressure drops in the water and steam flow circuits. Saturated steam entering the superheater from the boiler provides a stagnant insulation layer between the superheater and the boiler. In the particular design example illustrated, the superheater fuel element and the boiler fuel element are square. The fuel element for both the boiler region and the superheater region are comprised basically of a plurality of parallel, cylindrical pins 40. The basic difference between the two types of fuel elements is the solid moderator 41 surrounding the fuel pins in the superheater fuel element. Obviously, however, the pin-type element is not critical, and other fuel element configurations, such as the well-known plate or MTR-type elements, or hollow cylindrical elements can be equally satisfactorily employed. Similarly, there is wide choice in the cladding and structural material and the form of the fissile material. Further details regarding the fuel element are given below.

The control rods 28 are in cruciform shape, and the particular reactor design illustrated has 42 control rods which regulate power and provide shutdown. Fourteen of the rods are in the superheater and 28 in the boiler. As seen in FIG. 1, the rod drives extend from the bottom of the core tank into a subpile room. The drive mechanism may be suitably chosen from among the large number now available. One satisfactory drive system uses a hydraulic null balance which holds a piston assembly against a mechanical step, a simple screw device which operates near zero loads. The piston assembly causes a scram if either the reactor pressure or the operating accumulator pressure fails.

Turning now to FIGURES 7 and 8 for an examination of the superheated fuel element, the fuel is slightly enriched (about 2%) uranium dioxide fabricated as a small sintered, solid, pellet (0.5" long, 0.455" O.D.). However, the fuel form is not critical. Any form of fissile material, such as uranium or plutonium metals, alloys (e.g., uranium-thorium, uranium-molybdenum, uranium-zirconium, uranium-aluminum, etc.), and ceramics (e.g., carbides, nitrides, etc.) may be used. Similarly the cladding and structural material may satisfactorily vary among water corrosion resistant materials of relatively low thermal neutron absorption cross section. Satisfactory examples are aluminum alloys such as aluminum-aluminum oxide, zirconium and its alloys, nickel, titanium, niobium, and nickel-chromium alloys such as inconel. A plurality of fuel pellets are encased in a 0.020" wall stainless steel jacket 42. As seen in FIG. 8, each resulting fuel cylinder has a screw portion 43, is threaded to receive another such fuel cylinder, and the fuel cylinders are then connected together through a spider grid 44 to form an over all fuel pin 40. The superheater fuel cell consists of 36 such 10-foot pins in a 3.5" square fuel channel. The pins are connected at their ends to a fuel support plate 45. A 0.6" block of zirconium hydride 41 clad with 0.010" thick stainless steel 46 surrounds the 36 fuel pins as a picture frame and actually forms the flow channel. The exterior frame 47 of the fuel element is similarly of stainless steel in this embodiment, but any of the above metals may also be used. By orificing at the bottom grid plate a small amount of steam is bypassed between the individual superheater fuel cells to insure adequate cooling of the moderator. The superheater fuel cells shown permit removal of the moderator from the core if desired.

Saturated steam enters the superheater fuel element through an inlet duct 48 in the head fixture 49 above the active region and leaves through an orifice 50 in the tapered, hollow end fixture 51 which has a guide 52 to help in fuel loading. The average steam flow rate is 100 f.p.s. and the maximum cladding temperature is approximately 1300° F. in the hottest channel.

The exterior of the fuel element is notched along its length at 53 for control rod passage, and the fuel element thus guides the control rod in the core. A lifting bracket 54 is connected to fuel support plate 45 and a spring 55 is positioned between fuel support plate 45 and head fixture 49 to take up any fuel plate expansion. A gas space 56 above the zirconium hydride moderator is provided for expansion of any hydrogen (decomposed from the moderator) or other gases. The gas space may be filled with hydrogen or an inert gas. Additional zirconium hydride 57 or other moderator material is positioned in the head fixture to serve an axial reflector function.

The process flow diagram of our reactor system is shown in FIG. 9, which is self-explanatory with the legends applied thereon. It is noted that a direct cycle boiling water reactor is shown, wherein all the heat is removed by boiling followed by superheating, with the superheated steam going directly to the turbine without use of an intermediate heat exchanger. However, the dual cycle boiling water approach may also be suitably taken with our invention, wherein in addition to boiling, a portion of heated boiler water is passed to a heat exchanger.

The following table gives further details of the reactor described above.

Table

1. *Reactor*

| | |
|---|---|
| Nominal thermal power | Mw__ 420 |
| Inlet water temperature | °F__ 555 |
| Recirculation rate-boiler | 12.5:1 |
| Saturated steam temperature—1250 p.s.i.a. | °F__ 572 |
| Steam outlet temperature | °F__ 950 |
| Total steam flow rate at nominal power lb./hr. | $1.7 \times 10^6$ |
| Active core height | ft__ 10 |
| Active core diameter | ft__ 9 |
| Number of boiler elements | 196 |
| Number of superheater elements | 60 |
| Number of ½" rods per element | 36 |
| Critical loading | Kg. U-235__ 500 |
| $UO_2$ loading at nominal power | Kg__ 33,800 |
| Fuel enrichment—normal operation | a/o U-235__ 2 |
| Number of control-safety rods | 42 |
| Mixed mean outlet velocity—average boiler element | ft./sec.__ 13 |
| Outlet velocity—average superheater element ft./sec. | 110 |
| Weight of zirconium hydride in core | lb__ 1600 |

2. *Steam and Turbine-Generator*

| | |
|---|---|
| Nominal net electrical output | Mw__ 150 |
| Gross electrical output | Mw__ 165 |
| Steam pressure at turbine | p.s.i.a.__ 1200 |
| Steam temperature at turbine | °F__ 950 |
| Feedwater temperature to reactor | °F__ 375 |

An alternate superheater region is shown in FIGURES 10 and 11 using powdered $ZrH_2$. The $ZrH_2$ powder 58 is packed in a container vessel 59 through which process tubes 60 pass, resulting in a calandria-type core. This differs from the embodiment described above wherein massive $ZrH_2$ is part of the fuel cell itself. In the present embodiment, fuel elements (not shown) are positioned in the process channels defined by process tubes 60. Hydrogen gas pressure is applied through a line 61 to zirconium hydride powder 58 to balance the pressure of the superheated steam through the process tubes. This allows thin walled process tubes to be used, and maintains the hydrogen concentration of the hydride.

The above-described specific embodiments are only illustrative rather than restrictive of our invention. It should be appreciated that other design modifications may be made which are within the spirit of our invention.

We claim:

1. A nuclear reactor comprising in combination a closed vessel containing a core, a plurality of fuel-containing elements supported within said core; means for dividing said core into a first and a second region, each of said regions having a portion of said fuel elements located therein; means for generating steam in said first region; means for passing said steam through said second region and along the outer surface of said portion of fuel elements located in said second region so that said steam is superheated; means for extracting superheated steam from said second region, said portion of said fuel elements in said second region each having a solid moderator surrounding said fuel, said solid moderator being selected from the class consisting of graphite, beryllium, beryllium oxide, and hydrides of lithium, calcium, yttrium, niobium, vanadium, tantalum, titanium, and zirconium.

2. A nuclear reactor comprising in combination a closed vessel containing a core, a plurality of fuel-containing elements; means for supporting said fuel elements in said core; means dividing said core into two concentric regions, each region having a portion of said fuel elements; a water inlet in said vessel; means for passing water from said inlet through the first of said regions; means for extracting steam from said first region; means for passing said steam into the second of said region; means for superheating said steam in said second region, said last-named means including a solid moderator in each of said fuel elements located in said second region, said solid moderator being selected from the class consisting of graphite, beryllium, beryllium oxide, and hydrides of lithium, calcium, yttrium, niobium, vanadium, tantalum, titanium, and zirconium; and means for extracting superheated steam from said second region, said last-named means being located on the same side of said core as said water inlet.

3. A nuclear reactor comprising in combination a closed vessel containing a core, a plurality of fuel elements supported in said core; means dividing said fuel elements into two groups, one of said groups being annularly disposed about the other group; means for passing water upwardly over the fuel elements located in said annular group; means for extracting steam produced in said annular group; means for passing said steam downwardly through said other group, each of said fuel elements of said other group having a solid moderator surrounding said fuel, said solid moderator being selected from the class consisting of graphite, beryllium, beryllium oxide, and hydrides of lithium, calcium, yttrium, niobium, vanadium, tantalum, titanium, and zirconium.

4. A nuclear reactor comprising in combination a core, said core containing a plurality of fuel elements containing fissionable material; means dividing said plurality of fuel elements into two groups, one of said groups being cooled by vaporizing a liquid; means for passing the vapor from said first group through the fuel elements of said second group; said fuel elements of said second group being cooled by said vapor; neutron moderating means in said core, said neutron moderating means in said first group being said liquid, said moderating means in said second region being discrete masses of solid moderator in each of said fuel elements in said second group surrounding said fissionable material, said solid moderator being selected from the class consisting of graphite, beryllium, beryllium oxide, and hydrides of lithium, calcium, yttrium, niobrium, vanadium, tantalum, titanium, and zirconium.

5. A nuclear reactor comprising in combination a closed vessel containing a core; means for dividing said core into a first and second region; a first plurality of fuel elements supported in said first region; a water coolant surrounding said fuel elements in said first region; a second plurality of fuel elements supported in said second region, each of said fuel elements in said second region having a plurality of fissionable material containing members and a solid neutron moderating material surrounding each of said members; said solid moderating material being selected from the class consisting of graphite, beryllium, beryllium oxide, and hydrides of lithium, calcium, yttrium, niobium, vanadium, tantalum, titanium, and zirconium; said first and second plurality of fuel elements constituting a mass sufficient to sustain a chain reaction; means for vaporizing said water in said first region including said first and second plurality of fuel elements; means for passing said vaporized water around said members of said second plurality of fuel elements to superheat said vapor and to cool said second plurality of fuel elements; and means for preventing the passage of water from said first region into said second region.

6. A boiling water nuclear reactor comprising a pressure vessel, a core in said vessel, said core containing a plurality of fuel elements; means dividing said plurality of fuel elements into two groups for preventing the passage of liquid from one group to the other, a water moderator and coolant surrounding one group of said fuel elements, water inlet and outlet lines communicating with said one group of fuel elements, each of said fuel elements of said other group having a plurality of fissionable material containing members and a solid moderator surrounding each fuel element of said other group, said solid moderator being selected from the class consisting of graphite, beryllium, beryllium oxide, and hydrides of lithium, calcium, yttrium, niobium, vanadium, tantalum, titanium, and zirconium; means for boiling said water in said one group including both groups of said fuel elements; means for passing steam produced in said one group through said other group of fuel elements to superheat said steam and cool said other fuel element group, said last-named means including a steam inlet line communicating between said two groups of fuel elements and a steam outlet line passing through said vessel, said water inlet line and steam outlet line being on the bottom of said core.

7. A boiling water nuclear reactor comprising a pressure vessel, a core within said vessel, said core containing a plurality of fuel elements; means dividing said plurality of fuel elements into two groups for preventing the passage of liquid from one group to the other, the first group of fuel elements being annularly disposed about the centrally located second group of fuel elements, each of said fuel elements containing a coolant inlet, coolant outlet, fissionable material containing members and coolant flow channel therethrough, a water inlet in said vessel below said core and communicating with said first group of fuel elements, a water outlet above said core and communicating with said first group of fuel elements; means including said fuel elements of both of said groups for boiling water in said first group; means for extracting saturated steam from said first group and passing it through said channel of said second group of fuel elements; means including both said fuel element groups for superheating said saturated steam in said second group of fuel elements; means for moderating neutrons in said core, said means including water for said first group of fuel elements and a solid moderator disposed around and spaced from the fuel-containing members in each of said fuel elements of said second group and adjacent said coolant flow channel, said solid moderator being zirconium hydride.

(References on following page)

References Cited in the file of this patent

UNITED STATES PATENTS

| | | |
|---|---|---|
| 2,818,605 | Miller | Jan. 7, 1958 |
| 2,930,745 | Weil et al. | Mar. 29, 1960 |
| 2,931,762 | Fermi | Apr. 5, 1960 |
| 2,937,127 | Flora | May 17, 1960 |
| 2,938,845 | Treshow | May 31, 1960 |
| 2,938,848 | Ladd et al. | May 31, 1960 |

FOREIGN PATENTS

| | | |
|---|---|---|
| 614,156 | Great Britain | Dec. 10, 1948 |
| 1,039,659 | Germany | Sept. 25, 1958 |

OTHER REFERENCES

Nucleonics, vol. 14, No. 11, November 1956, pp. 146–153.

Energia Nuclear, vol. 4, No. 6, December 1957, pp. 457–459.